(12) United States Patent
Duan et al.

(10) Patent No.: US 7,823,995 B2
(45) Date of Patent: Nov. 2, 2010

(54) SLIDE ASSEMBLY WITH TRANSMITTING MECHANISM

(75) Inventors: Zhi-Ming Duan, Shenzhen (CN); Jun Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 640 days.

(21) Appl. No.: 11/768,925

(22) Filed: Jun. 27, 2007

(65) Prior Publication Data

US 2008/0226208 A1 Sep. 18, 2008

(30) Foreign Application Priority Data

Mar. 12, 2007 (CN) .................... 2007 2 0200136 U

(51) Int. Cl.
*A47B 88/04* (2006.01)

(52) U.S. Cl. ...................... 312/333; 312/334.46; 384/21

(58) Field of Classification Search ............. 312/330.1, 312/334.1, 334.7, 334.8, 334.11, 334.44, 312/334.46, 334.47, 333; 384/18, 21, 22
See application file for complete search history.

(56) References Cited

U.S. PATENT DOCUMENTS

| | | | | |
|---|---|---|---|---|
| 3,650,578 A | * | 3/1972 | Del Vecchio et al. .......... | 384/18 |
| 5,292,198 A | * | 3/1994 | Rock et al. .................... | 384/21 |
| 6,155,661 A | * | 12/2000 | O'Neil et al. .......... | 312/334.44 |
| 6,450,600 B1 | * | 9/2002 | Chen et al. ............. | 312/334.46 |
| 6,585,335 B2 | * | 7/2003 | Hwang et al. ............... | 312/333 |
| 6,899,408 B2 | * | 5/2005 | Chen et al. ............. | 312/334.44 |
| 6,997,611 B2 | * | 2/2006 | Chen et al. .................... | 384/21 |
| 7,118,277 B2 | * | 10/2006 | Chen et al. .................... | 384/21 |
| 2006/0288529 A1 | * | 12/2006 | Chen et al. .................. | 16/96 R |

* cited by examiner

*Primary Examiner*—James O Hansen
(74) *Attorney, Agent, or Firm*—Frank R. Niranjan

(57) ABSTRACT

A slide assembly includes an outer slide (10), an intermediate slide (30) telescopically attached to the outer slide, an inner slide (90) telescopically attached to the intermediate slide, and a transmitting mechanism (31) detachably attached to the intermediate slide. The outer slide has a blocking portion (11). A fulcrum (365) is formed on the intermediate slide. The transmitting mechanism includes a driving member (35) and a post member (38). The driving member includes a driving portion (357), a lifting end (351), and a resilient member (37). The post member is connected to the lifting end of the driving member and traversed through the intermediate slide. A head portion (381) is formed on the post member and configured for engaging with the blocking portion. The resilient member is attached to the post member for urging the post member to return to an original position.

14 Claims, 8 Drawing Sheets

US 7,823,995 B2

SLIDE ASSEMBLY WITH TRANSMITTING MECHANISM

BACKGROUND OF THE INVENTION

1. Field of the Invention

The present invention relates to a slide assembly with a transmitting mechanism for preventing one slide of the slide assembly retraced therefrom with undesired operation.

2. Description of Related Art

A conventional three-section slide for a server includes a first slide, a second slide, and a third slide. A slide-aiding ball member is sandwiched in between any two of the first slide, the second slide, and the third slide so as to smoothen sliding movement. Moreover, the first slide and the second slide have a retaining member and a stop member mounted thereon respectively, for restricting movement. The retaining member is attached to an inner surface of the first slide, and provided with an engaging portion. The stop member is mounted to a front end of the second slide, and provided with a protrusion. To prevent accidental disassembly, when users draw out the first slide from the second slide, the protrusion of the stop member engages with the engaging portion of the retaining member.

Although the engagement of the stop member with the engaging portion can avoid releasing the first slide from the second slide by accident, the portion of the engagement is positioned at the distal end of the second slide, the first slide and the second slide can hurt user's finger by accident when the user directly disengaging the engaging portion from the stop member so as to retract the first slide into the second slide. Therefore, it is inconvenient for users to operate the slide.

What is needed, therefore, is a transmitting mechanism for a slide assembly which may be easily and securely operated.

SUMMARY OF THE INVENTION

A slide assembly includes an outer slide, an intermediate slide telescopically attached to the outer slide, an inner slide telescopically attached to the intermediate slide, and a transmitting mechanism detachably attached to the intermediate slide. The outer slide has a blocking portion. A fulcrum is formed on the intermediate slide. The transmitting mechanism includes a driving member and a post member. The driving member includes a driving portion, a lifting end, and a resilient member. The post member is connected to the lifting end of the driving member and traversed through the intermediate slide. A head portion is formed on the post member and configured for engaging with the blocking portion. The resilient member is attached to the post member for urging the post member to return to an original position.

Other advantages and novel features of the present invention will become more apparent from the following detailed description of a preferred embodiment when taken in conjunction with the accompanying drawings, in which:

DETAILED DESCRIPTION OF THE INVENTION

Figure 1:
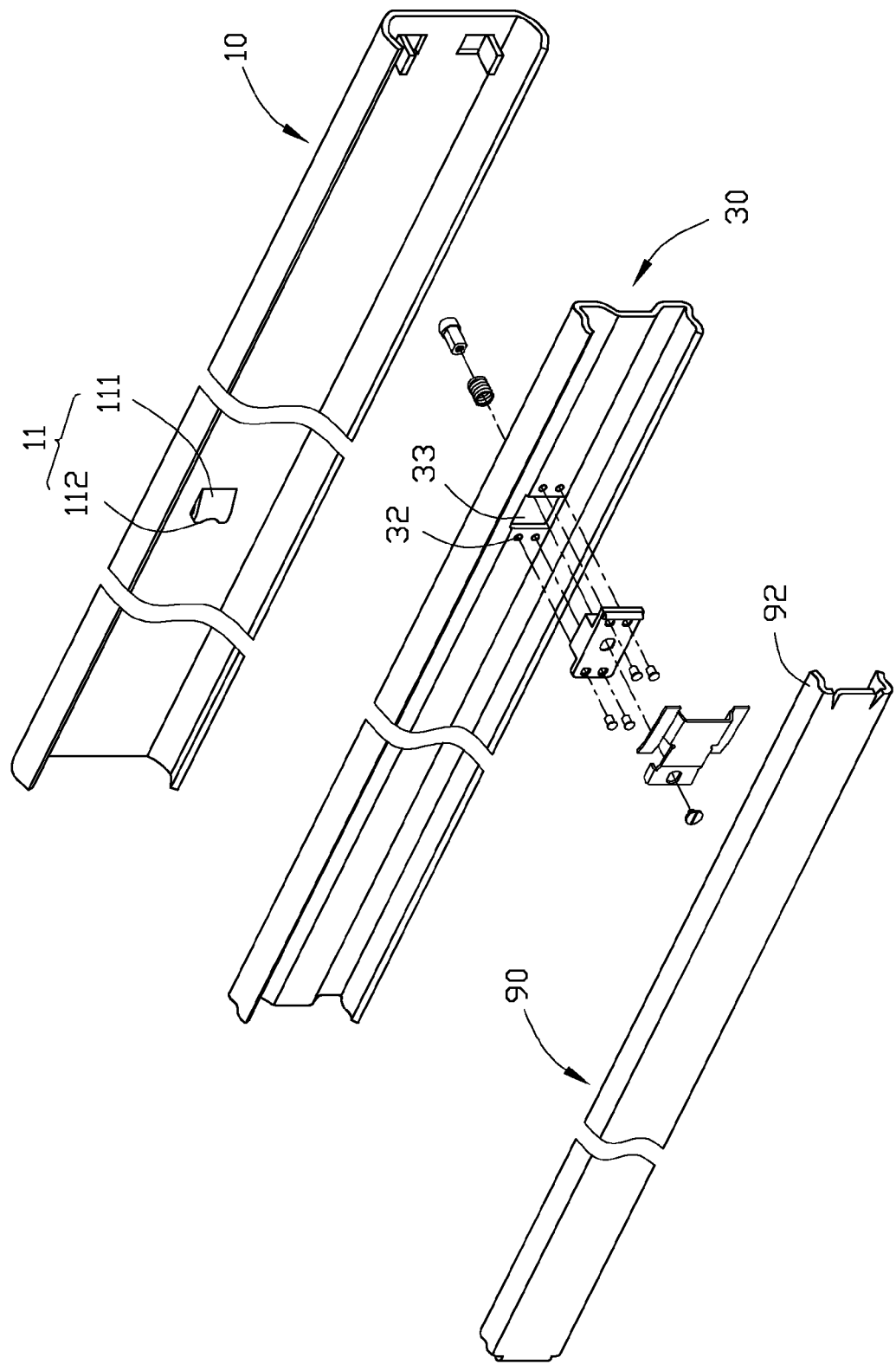
FIG. 1 is a partially exploded, isometric view of a slide assembly according to a preferred embodiment of the present invention, the slide assembly comprising an outer slide, an intermediate slide, an inner slide, and a transmitting mechanism attached to the intermediate slide.
Figure 2:
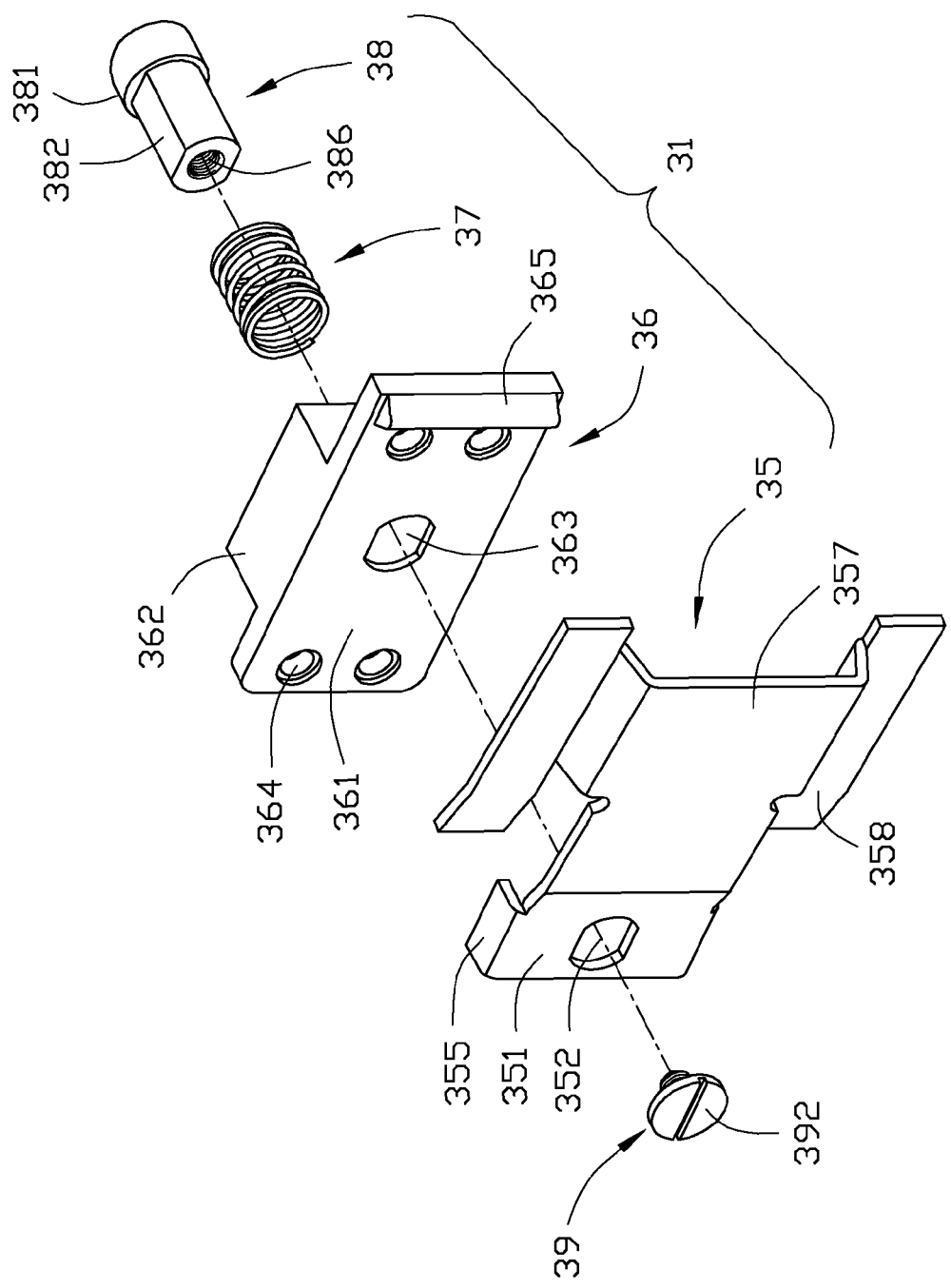
FIG. 2 is an enlarged, exploded view of the transmitting mechanism of FIG. 1.

Referring to FIG. 1 and FIG. 2, a slide assembly includes an outer slide 10, an intermediate slide 30, and an inner slide 90. The intermediate slide 30 is fit within the outer slide 10, and the inner slide 90 has bent edges 92 slotted into the intermediate slide 30 so that the inner slide 90 can slide within the intermediate slide 30, which can slide within the outer slide 10. A blocking portion such as a tab 11 protrudes from an inner side of the outer slide 10 for blocking undesired movement of the intermediate slide 30. The blocking tab 11 includes a slanted guiding surface 111 and a raised blocking end 112. The blocking end 112 defines a cutout therein. A transmitting mechanism 31 is detachably attached to the intermediate slide 30. A rectangular opening 33 is defined in the intermediate slide 30 for receiving the transmitting mechanism 31. A plurality of retaining holes 32 is defined adjacent the opening 33 for retaining the transmitting mechanism 31.

Figure 3:
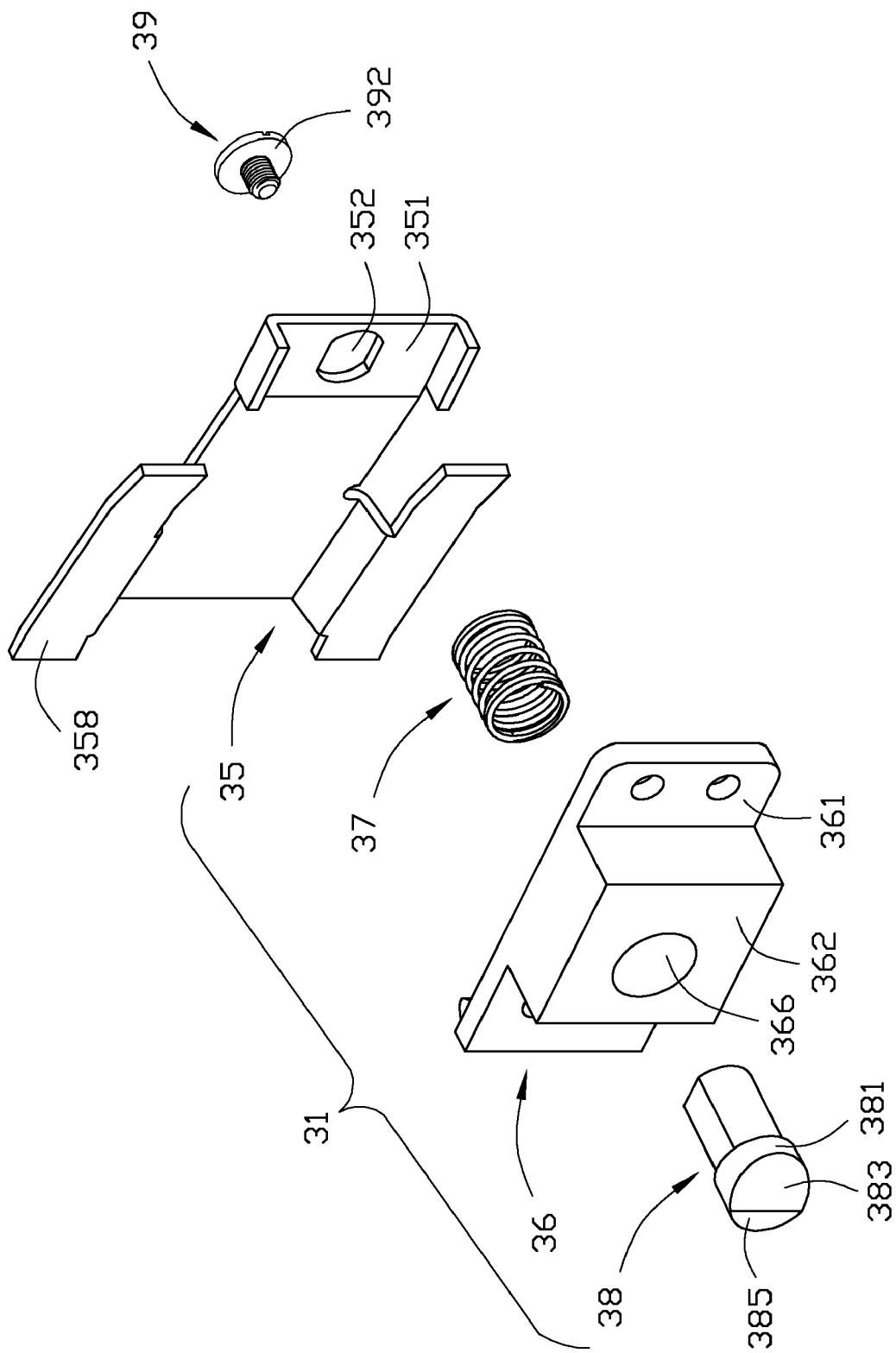
FIG. 3 is similar to FIG. 2, but shown from another aspect.

Referring also to FIG. 3, the transmitting mechanism 31 includes a driving member 35, a base member 36, a post member 38, a spring 37, and a screw 39. The post member 38 has a shank 382 and an enlarged head portion 381. The head portion 381 includes a slanted portion 383, which is slidable over the slanted tab 11 and an engaging portion 385. The driving member 35 has a lifting end 351 and a driving portion 357 at opposites sides thereof respectively. A through hole 352 is defined in the lifting end 351 for receiving the shank 382 of the post member 38. A pair of flanges 355 is respectively bent perpendicularly from opposite sides of the lifting end 351. A pair of strip-shaped driving arms 358 is formed on opposite sides of the driving portion 357 respectively. Each driving arm 358 is extended slantwise to an inner surface of the intermediate slide 30. The base member 36 has a base plate 361 and a base platform 362. A hole 366 is defined in the base platform 362 for guiding the post member 38. An elongate-spired ridge 365 serving as a fulcrum is formed on one side of the base plate 361 corresponding to a middle portion of the driving member 35. A through hole 363 is defined in the base plate 361 for receiving the shank 382 of the post member 38 and preventing the head portion 381 of the post member 38 from passing through from an inner side of the base plate 361. The screw 39 can be fastened to a distal end of the shank 382 through the through holes 352, 363. The screw 39 has an enlarged head 392, which is blocked by an outer side of the driving member 35.

Figure 4:
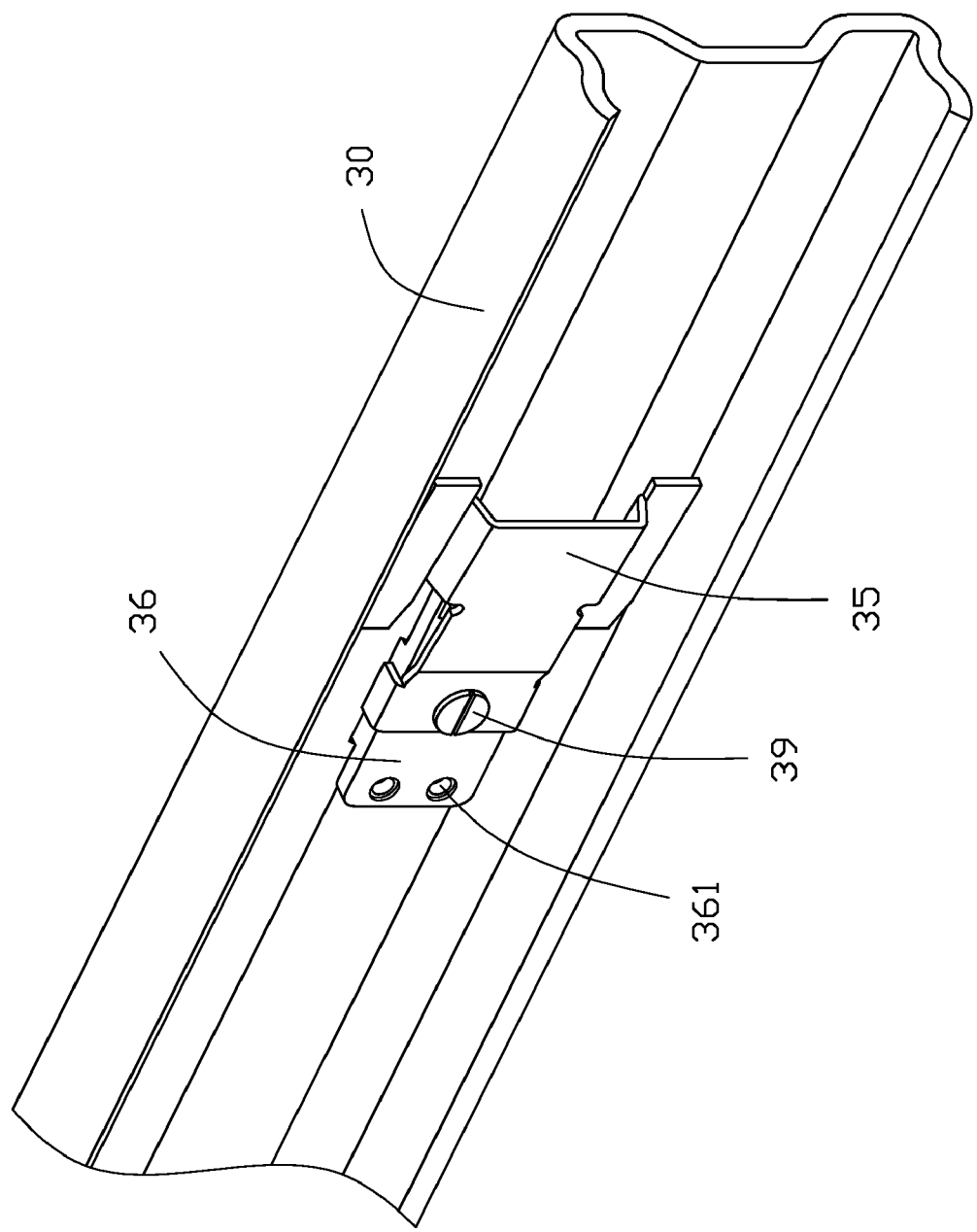
FIG. 4 is an assembled view of the intermediate slide, and the transmitting mechanism of FIG. 1.
Figure 5:
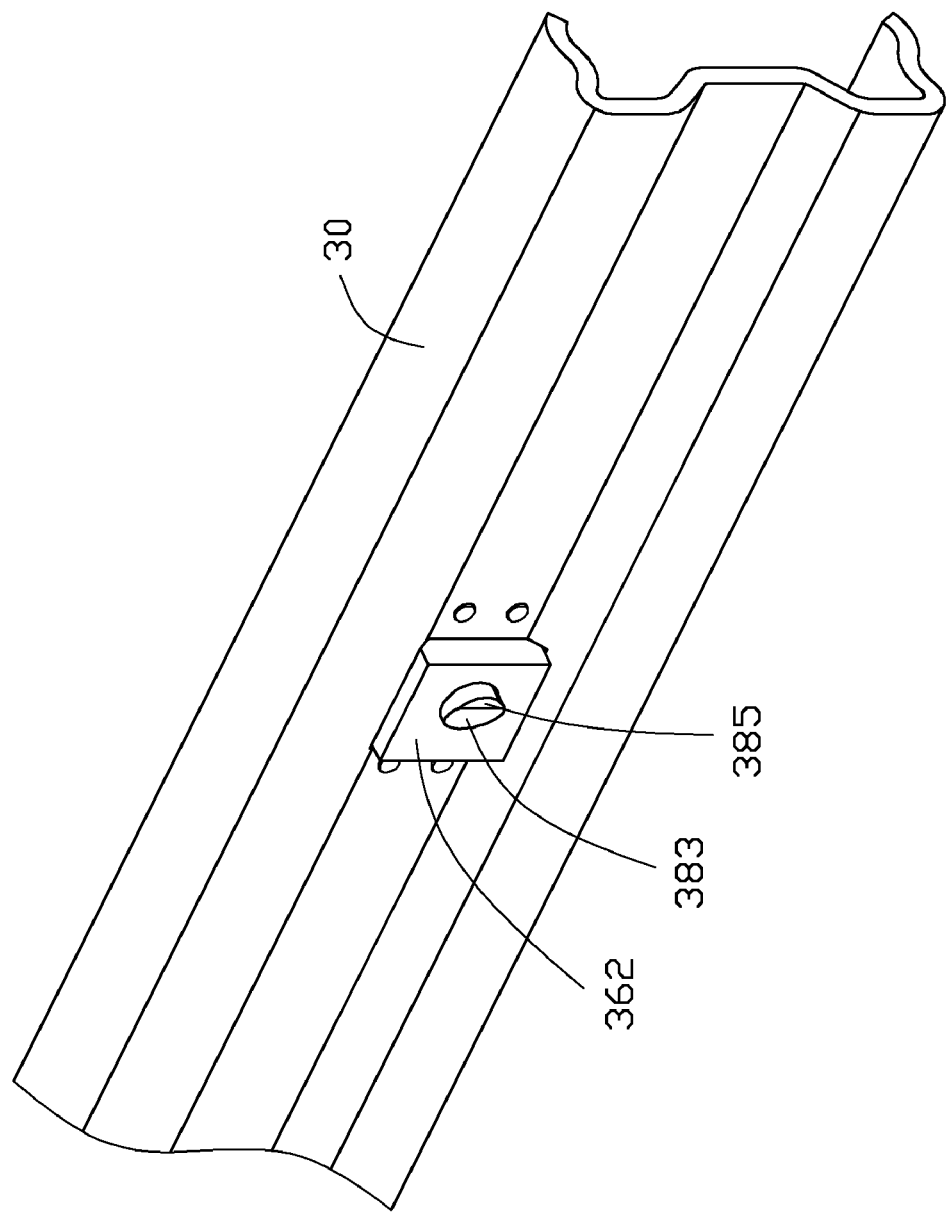
FIG. 5 is an assembled view of the intermediate slide and the transmitting mechanism of FIG. 1, but shown from another aspect.

Referring to FIG. 4 and FIG. 5, when assembling the transmitting mechanism 31 to the intermediate slide 30, the base member 36 is retained in the intermediate slide 30 via a plurality of screws fastened through the retaining holes 364 to engage in the retaining holes 32 respectively. The base platform 362 is engaged in the opening 33 of the intermediate slide 30. The post member 38 is inserted into the hole 366 with the distal end of the shank 382 passing through the through holes 363 and 352, and the spring 37 is attached around the shank 382 and held between the head portion 381 and the base plate 361 of the base member 36. The screw 39 is then screwed into the distal end of the shank 382. The ridge 365 abuts against the middle portion of the driving member 35 between the lifting end 351 and the driving portion 357.

Figure 6:
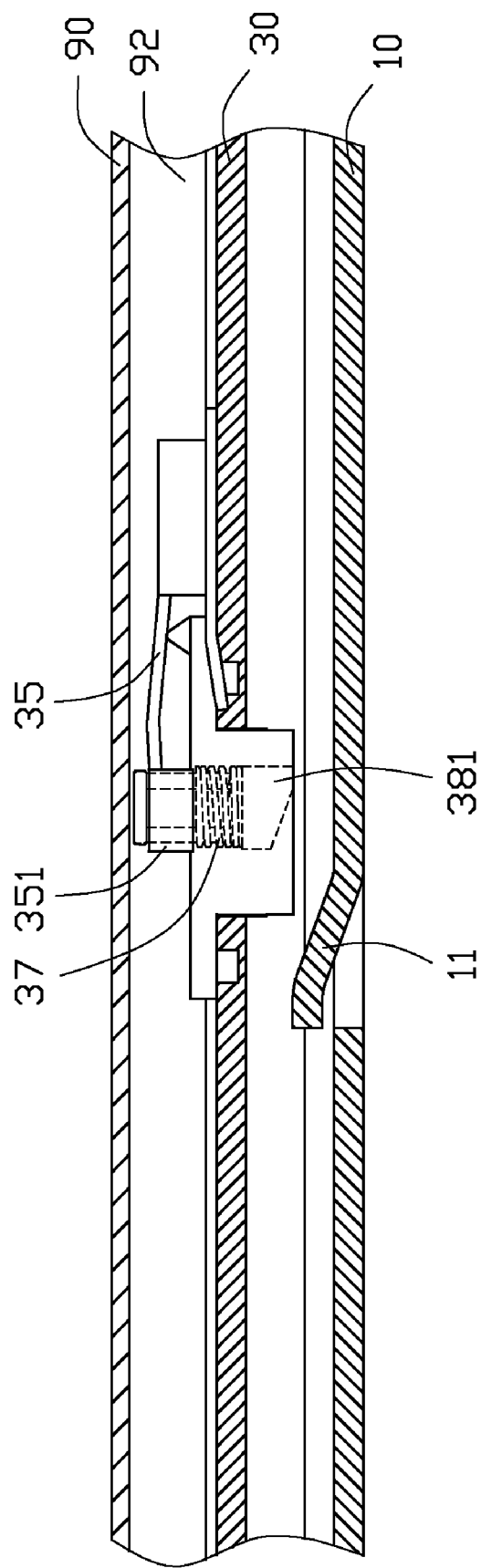
FIG. 6 is a cut-away view of the slide assembly with the inner slide and the intermediate slide in a retracted position.

Referring also to FIG. 6, when assembling the slide assembly, the intermediate slide 30 is first slid into the outer slide 10, and the inner slide 90 is then slid into the intermediate slide 30 with each bent edge 92 urging the corresponding driving arm 358, so that the driving member 35 is pivoted about the 365 and the lifting end 351 of the driving member 35 is lifted up. The lifting end 351 draws the post member 38 away from the outer slide 10. The spring 37 is compressed, and the head portion 381 of the post member 38 is totally retained in the hole 366.

Figure 7:
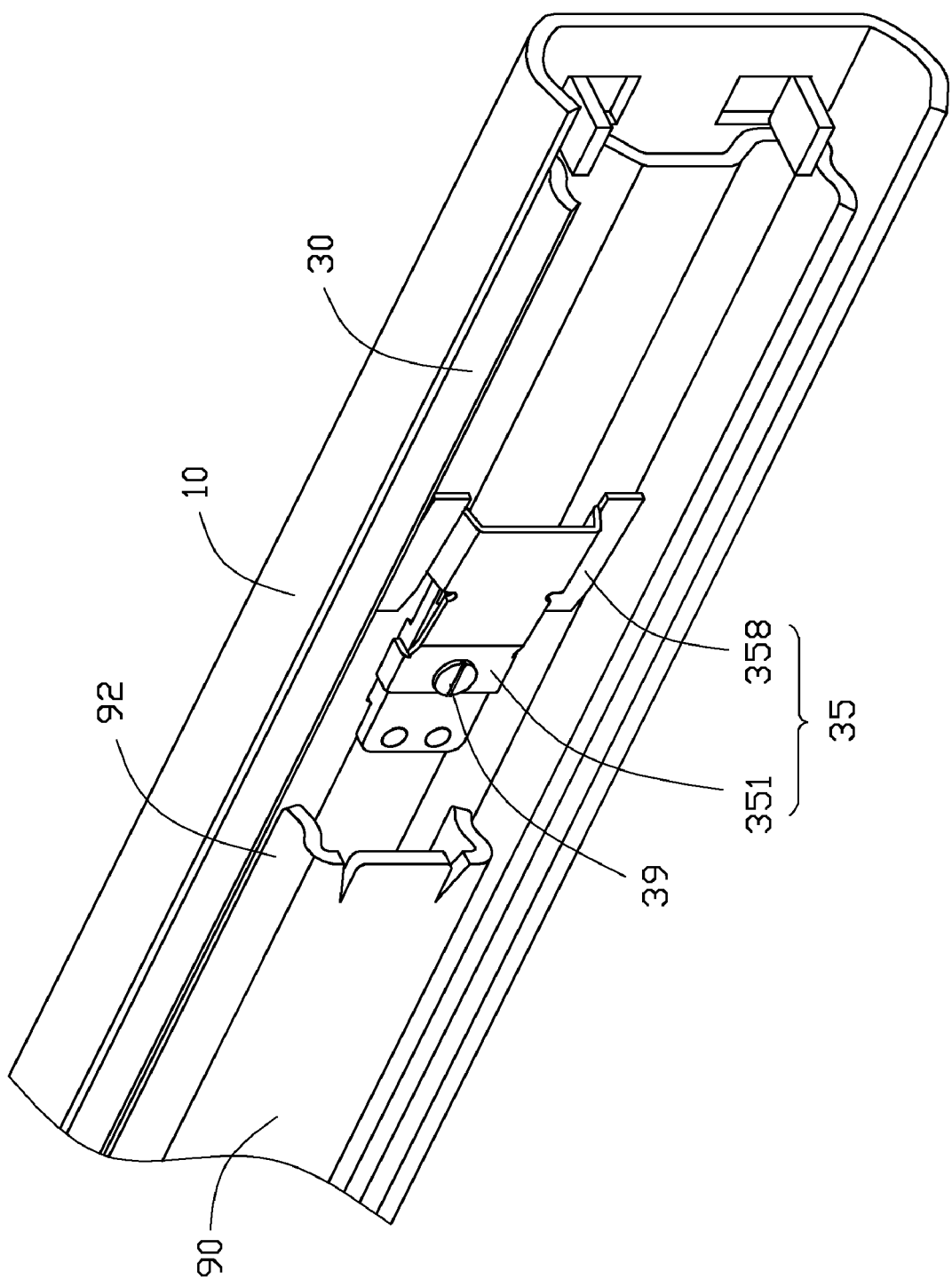
FIG. 7 is an isometric view of the slide assembly when the inner slide is extended from the intermediate slide.

Referring also to FIG. 7, when extending the slide assembly, the intermediate slide 30 and the inner slide 90 both slide outward from the outer slide 10. When the intermediate slide 30 is stopped at an end of the outer slide 10, the retaining member 31 is aligned with the blocking tab 11 of the outer slide 10. The head portion 381 of the post member 38 will not move out until the inner slide 90 slides outward away from the driving arm 358 of the driving member 35, thus causing rebounding of the spring 37. When the head portion 381 of the post member 38 moves out of the base member 36, the engaging portion 385 engages with the blocking end 112 of the outer slide 10 for preventing accidental retraction of the intermediate slide 30.

Figure 8:
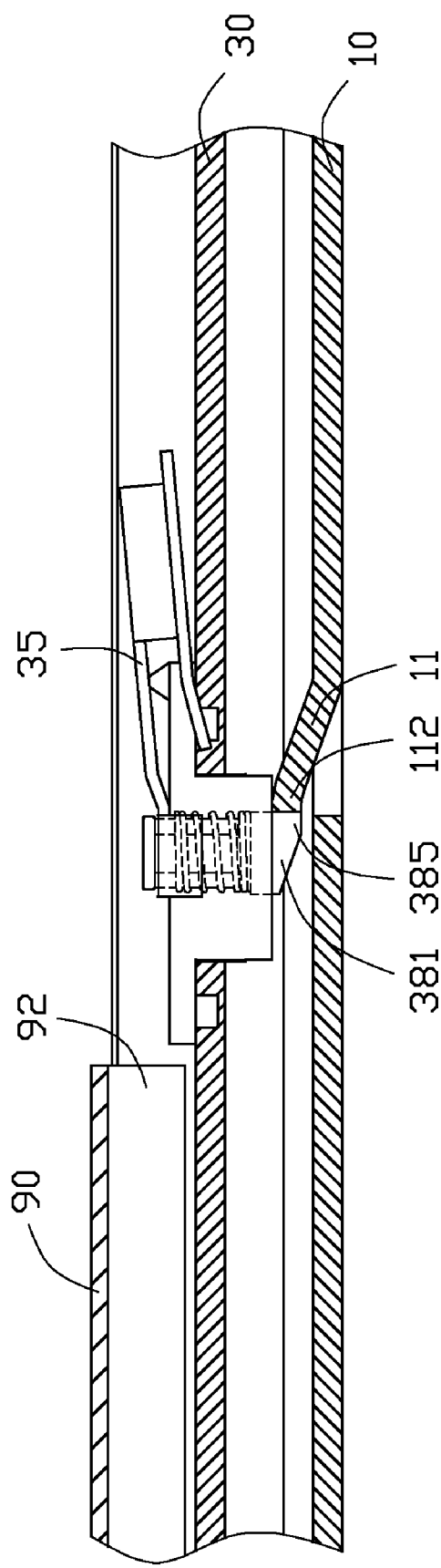
FIG. 8 is similar to FIG. 6, but the slide assembly is in an extended position.

Referring also to FIG. 8, when pushing the slide assembly in, the intermediate slide 30 is blocked by the post member 38, so that the inner slide 90 is slid relative to the intermediate slide 30 first. When the inner slide 90 slides to an end of the intermediate slide 30, the bent edges 92 of the inner slide 90 urge the driving arms 358 of the driving member to move towards the intermediate slide 30, and then the lifting end 351 and the post member 38 are lifted up to disengage the engaging portion 385 from the blocking end 112 of the blocking tab 11. Thus, the inner slide 90 and the intermediate slide 30 can be slid together into the outer slide 10.

In other embodiments, same facilities of the base member 36 can be integrated into the intermediate slide 30. The through hole 363 can be defined in the intermediate slide 30, and the ridge 365 can be formed on an inner side of the intermediate slide 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slide assembly comprising:
an outer slide having a blocking portion;
an intermediate slide telescopically attached to the outer slide and being slidable relative to the outer slide between an extended position and a retracted position, a fulcrum formed on a base member, and the base member being attached to the intermediate slide;
an inner slide telescopically attached to the intermediate slide; and
a transmitting mechanism detachably attached to the intermediate slide, the transmitting mechanism comprising:
a driving member comprising a driving portion and a lifting end, the driving member abutting against the fulcrum with the lifting end and the driving portion at opposite sides of the fulcrum;
a post member connected to the lifting end of the driving member and traversed through the intermediate slide, a head portion formed on the post member and configured for engaging with the blocking portion to block the intermediate slide retracting from the extended position to the retracted position; and
a resilient member attached to the post member for urging the post member to return to an original position;
wherein the inner slide is slidable along the intermediate slide to press the driving portion of the driving member such that the lifting end is levered up about the fulcrum to cause the post member to disengage from the blocking portion, thereby allowing the intermediate slide retracting from the extended position to the retracted position; and the post member comprises a shank extending through the intermediate slide to fix with the lifting end of the driving member, the head portion is an enlarged portion relative to the shank, and the resilient member is surrounded on the shank and compressed between the head portion and the intermediate slide.

2. The slide assembly as described in claim 1, wherein the inner slide is slidable away from the driving portion of the driving member to release the driving portion such that the post member is driven to engage with the blocking portion by rebounding of the resilient member to retain the intermediate slide at the extended position.

3. The slide assembly as described in claim 1, wherein the driving portion further comprises at least one strip-shaped driving arm, the at least one driving arm is extended slantwise relative to an inner surface of the intermediate slide, and the inner slide further comprises at least one bent edge for urging the at least one driving arm to pivot down.

4. The slide assembly as described in claim 1, wherein the fulcrum is implemented by an elongate-spire shaped ridge, and the ridge abuts on a middle portion of the driving member.

5. The slide assembly as described in claim 1, wherein a through hole is defined in the lifting end of the driving member for receiving the post member.

6. The slide assembly as described in claim 1, wherein the blocking portion is a tab bent from and slantwise relative to an inner side of the outer slide, and the tab comprises a blocking end for resisting the head portion of the post member.

7. A slide assembly comprising:
an outer slide;
an intermediate slide telescopically attached to an inner side of the outer slide;
an inner slide telescopically attached to an inner side of the intermediate slide; and
a transmitting mechanism extending through the intermediate slide;
wherein when the inner slide slides over the transmitting mechanism along a lengthwise direction parallel to the intermediate slide from a retracted position where the inner slide abuts against the transmitting mechanism to an extended position where the inner slide releases the transmitting mechanism, the transmitting mechanism moves in a lateral direction perpendicular to the intermediate slide to engage with the outer slide to block the intermediate slide retracting into the outer slide;
the transmitting mechanism comprises a driving member and a post member configured for engaging with the outer slide, and the driving member is pivotable by being urged from a first side by the inner slide or from an opposite second side which is fixed with the post member by the post member;

a blocking tab is formed on and slantwise relative to an inner side of the outer slide, and the blocking tab comprises a blocking end for retaining a head portion of the post member;

the post member comprises a shank extending through the intermediate slide to fix with the lifting end of the driving member, the head portion is an enlarged portion relative to the shank, and a resilient member is surrounded on the shank and compressed between the head portion and the intermediate slide.

8. The slide assembly as described in claim 7, wherein the driving member further comprises at least one strip-shaped driving arm at the first side, the at least one driving arm is extended slantwise to an inner surface of the intermediate slide, and the inner slide further comprises at least one bent edge slidably engaged with the intermediate slide and capable of urging the at least one driving arm to move toward the intermediate slide in the lateral direction such that the second slide draws the post member to move away from the outer slide in the lateral direction to thereby disengage from the outer slide.

9. The slide assembly as described in claim 7, wherein a ridge acting as a fulcrum is formed on a base member, and the base member is attached to the intermediate slide, and the ridge abuts on a middle portion of the driving member between the first side and the second side of the driving member.

10. The slide assembly as described in claim 7, wherein a through hole is defined in the second side of the driving member for receiving the post member.

11. A slide assembly comprising:

an outer slide having a blocking portion formed at an inside thereof;

an intermediate slide telescopically attached to the inside of the outer slide and being slidable relative to the outer slide between an extended position and a retracted position;

an inner slide telescopically attached to an inside of the intermediate slide opposing the outer slide;

a driving member comprising a driving end and a lifting end, a fulcrum being formed between the driving member and the intermediate slide such that when one of the driving end and the lifting end is urged by a force the lifting end and the driving end is pivotable about the fulcrum, and the driving member abutting against the fulcrum, with the lifting end and the driving portion at opposite sides of the fulcrum;

a post member fixed with the lifting end of the driving member and traversed through the intermediate slide, the post member having an engaging portion formed at one end thereof adjacent the outer slide and configured for engaging with the blocking portion to block the intermediate slide retracting from the extended position to the retracted position; and a resilient member configured for maintaining the post member engaging with the blocking portion of the outer slide;

wherein the inner slide is slidable along the intermediate slide to press the driving end of the driving member toward the intermediate slide such that the lifting end is pivoted about the fulcrum to draw the post member to disengage from the blocking portion, thereby allowing the intermediate slide retracting from the extended position to the refracted position; the inner slide is slidable away from the driving portion of the driving member to release the driving portion such that the post member is driven to engage with the blocking portion by rebounding of the resilient member to maintain the intermediate slide at the extended position; and the intermediate slide defines an opening, a base member comprises a base plate fixed to the inner surface of the intermediate slide and a base platform extending from the base plate and through the opening, a stepped hole with a shoulder formed therein is defined through the base plate and the base platform, an opposite end of the post member extends through the hole to fix with the lifting end of the driving member, and the resilient member is received in the hole and compressed between the step and the engaging portion.

12. The slide assembly as described in claim 11, wherein the driving portion further comprises at least one strip-shaped driving arm, the at least one driving arm is slantwise relative to an inner surface of the intermediate slide, and the inner slide further comprises at least one bent edge configured for pressing the at least one driving arm to cause the driving member to pivot about the fulcrum.

13. The slide assembly as described in claim 11, wherein an elongate-spired ridge serving as the fulcrum is formed on the base plate.

14. The slide assembly as described in claim 11, wherein the engaging portion has a slanted surface, the blocking portion comprises a slanted tab extending from the inside of the outer slide, the slanted surface of the engaging portion is slidable over the slanted tab when the intermediate slide extends to the extended position.

* * * * *